United States Patent [19]

Huibers

[11] Patent Number: 5,835,256

[45] Date of Patent: Nov. 10, 1998

[54] REFLECTIVE SPATIAL LIGHT MODULATOR WITH ENCAPSULATED MICRO-MECHANICAL ELEMENTS

[75] Inventor: Andrew Huibers, Pennington, N.J.

[73] Assignee: Reflectivity, Inc., Palo Alto, Calif.

[21] Appl. No.: 665,380

[22] Filed: Jun. 18, 1996

Related U.S. Application Data

[60] Provisional application No. 60/000,322, Jun. 19, 1995.

[51] Int. Cl.⁶ .................................................. G02B 26/00
[52] U.S. Cl. ........................................... 359/291; 359/295
[58] Field of Search ..................................... 359/291, 295

[56] References Cited

U.S. PATENT DOCUMENTS

| | | |
|---|---|---|
| 3,746,911 | 7/1973 | Nathanson . |
| 4,229,732 | 10/1980 | Hartstein . |
| 5,078,479 | 1/1992 | Vuilleumier ............................. 359/290 |
| 5,216,537 | 6/1993 | Hornbeck ................................ 359/291 |
| 5,311,360 | 5/1994 | Bloom ..................................... 359/572 |
| 5,535,047 | 7/1996 | Hornbeck ................................ 359/295 |

OTHER PUBLICATIONS

Jaecklin "Line–Addressable Torsional Micromirrors for Light Modulator Arrays" Sensors & Actuators A, 1994, pp. 324–329, 441–442, Elsevier.

Gerhard–Multhaupt "Light–Valve Projection Displays—an Introduction" Displays, Jan. 1995, pp. 5–7, v16 n1, Elsevier Science, Holland.

Gerhard–Multhaupt "Light–Valve Technologies for High–Definition Television Projection Displays" Displays, 1991, pp. 115–128, v12 n3/4.

Petersen "Micromechanical light modulator Array Fabricated on Silicon" Applied Physics Letters, 15 Oct. 1977, pp. 521–523, v31 n8, Amer. Inst. of Physics.

Cadman "New Micromechanical Display Using Thin Metallic Films" IEEE Electron Device Letters, Jan. 1983, pp.3–4, vEDL-4 n1, IEEE (U.S.A.).

Kück "Deformable Micromirror Devices as Phase–Mod High Resolution Light Valves" Transducers '95/Eurosensors IX, 29 Jun. 1995, Conf. Proceedings, Stockholm, Sweden.

*Primary Examiner*—Vincent P. McGraw

[57] ABSTRACT

A spatial light modulator, comprised of an upper and a lower substrate. One or more electrostatically deflectable mirrors are suspended by torsion hinges from an optically transmissive upper substrate. The upper substrate is held above the lower substrate containing electronic circuitry. In operation, individual mirrors are selectively deflected and serve to spatially modulate light that is incident to, and then reflected back through, the upper substrate. An aperture layer is built into the upper substrate to enable light to reach only the flat mirror surfaces.

19 Claims, 10 Drawing Sheets

REFLECTIVE SPATIAL LIGHT MODULATOR WITH ENCAPSULATED MICRO-MECHANICAL ELEMENTS

RELATED CASES

This application claims the benefit of United States Provisional Patent Application Serial No. 60/000,322 filed on Jun. 19, 1995.

BACKGROUND OF THE INVENTION

1. Field of Invention

The present invention relates to spatial light modulators, and, more particularly, to spatial light modulators with electronically addressable deflectable elements attached to an optically transmissive substrate.

2. Description of Prior Art

Spatial light modulators (SLMs) are transducers that modulate an incident beam of light in a spatial pattern that corresponds to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

An early SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bend towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen. Another electron-beam-addressed SLM is the Eidophor, described in E. Baumann, "The Fischer large-screen projection system (Eidophor)" 20 J.SMPTE 351 (1953). In this system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their the use of bulky and expensive vacuum tubes.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low efficiency due to the small fractional active area. In addition, diffraction from the addressing circuitry lowers the contrast ratio (modulation depth) of the display.

A silicon-based micro-mechanical SLM with a large fractional optically active area is the Digital Mirror Device (DMD), developed by Texas Instruments and described by Hornbeck, U.S. Pat. No. 5,216,537 and its references. The most recent implementations comprise a square aluminum plate suspended via torsion hinges above addressing electrodes. A second aluminum plate is built on top of the first and is used as a mirror. Although increasing manufacturing complexity, the double plate aluminum structure is required to provide a reasonably flat mirror surface and cover the underlying circuitry and hinge mechanism. This is essential in order to achieve an acceptable contrast ratio. The entire aluminum structure is released via oxygen plasma etching of a polymer sacrificial layer. Aluminum can be deposited at low temperatures, avoiding damage to the underlying CMOS addressing circuitry. However, the hinges attaching the mirrors to the substrate are also made of aluminum, which is very susceptible to fatigue and plastic deformation. The DMD is a complex device and requires many well-controlled steps to manufacture; commercialization of the DMD has proceeded slowly.

Another SLM fabricated on a flat substrate is the Grating Light Valve (GLV) described by Bloom, et. al., U.S. Pat. No. 5,311,360. The GLV's deflectable mechanical elements are reflective flat beams or ribbons. Light reflects from both the ribbons and the substrate. If the distance between surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. Construction of the GLV differs substantially from the DMD. Instead of using active semiconductor circuitry at each pixel location, the presently favored approach relies on an inherent electromechanical bistability to implement a passive addressing scheme. The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. This latching action allows driver circuitry to be placed off-chip or only at the periphery. Thus addressing circuitry does not occupy the optically active part of the array. In addition, ceramic films of high mechanical quality, such as LPCVD (low pressure chemical vapor deposition) silicon nitride, can be used to form the ribbons. However, there are several difficulties with the GLV. One problem is stiction: since the underside of the deflected ribbons contacts the substrate with a large surface area, the ribbons tend to stick to the substrate. Another problem is that a passive addressing scheme might not be able to provide high frame rates (the rate at which the entire SLM field is updated). In addition, with a passive addressing scheme, the ribbons deflect slightly even when off. This reduces the achievable contrast ratio. Also, even though the device is substantially planar, light is scattered, as in the DMD, from areas between the pixels, further reducing the contrast ratio.

Another diffraction-based SLM is the Microdisplay, described in P. Alvelda, "High-Efficiency Color Microdisplays" 307 SID 95 Digest. This SLM uses a liquid crystal layer on top of electrodes arrayed in a grating pattern. Pixels can be turned on and off by applying appropriate voltages to alternating electrodes. The device is actively addressed and potentially has a better contrast ratio than the GLV. However, optical energy is absorbed by the liquid crystal material: the Microdisplay is unable to tolerate large incident optical powers.

Micro-mechanical mirror-based SLMs have an advantage over diffraction-based SLMs because they reflect incident light at only one angle, which can be quite large. This simplifies the design of the optical system in which the modulated reflected light may pass through the center of the imaging lens, while maintaining high efficiency. This results in an image with fewer aberrations and lowers manufacturing cost.

The need therefore is for a spatial light modulator with a high contrast ratio, which is easy to fabricate, and whose moving elements are made of reliable mechanical materials.

SUMMARY OF THE INVENTION

1. Objects of the Invention

An object of the present invention is thus to provide a spatial light modulator which can exhibit most of the following characteristics: high resolution, high speed, large number of gray levels (over 100), a high contrast ratio (good modulation depth), optical flatness, VLSI (CMOS) compatibility, high reliability and lifetime, robust packaging, and low cost.

Another object of this invention is to provide a SLM in which the light modulating elements may be conveniently located near corresponding addressing circuitry without compromising any of the above desirable properties.

Yet another object of this invention is to provide a SLM which has a tolerance for high incident optical power and which has good optical efficiency.

2. Summary

Briefly, a preferred embodiment of this invention includes a spatial light modulator. The spatial light modulator comprises an upper and a lower substrate. One or more mechanically deflectable reflective elements are suspended underneath the upper substrate, which is optically transmissive. This optically transmissive substrate is held above a second substrate containing electronic circuitry. In operation, individual reflective elements are selectively deflected and serve to spatially modulate light that is incident to, and then reflected back through, the optically transmissive substrate.

In one embodiment of this invention, the spatial light modulator comprises an array of pixels. Each pixel comprises a single deflectable rigid mirror and a torsion hinge, which attaches the mirror to an upper, optically transmissive substrate. The optically transmissive substrate is held above a silicon substrate, on which is formed an array of electrodes. An aperture layer is built into the optically transmissive substrate to block light from reaching the electrodes or the mirror support structure (hinges and attachments). Individual mirrors are selectively deflected electrostatically by applying a voltage bias between individual mirrors and their corresponding electrodes. The electrical addressing circuitry on the silicon substrate is fabricated using standard VLSI technology, and resembles a low-density DRAM.

Since the two substrates are joined together after they are individually fabricated, the fabrication processes for each substrate need not be compatible. As there is no concern for VLSI compatibility during the manufacturing of the top substrate, an advantage of the spatial light modulator of this invention is that the mechanically deflectable reflective elements can be made from materials chosen only for their excellent mechanical properties, such as LPCVD silicon nitride and polysilicon. Since these films are deposited at high temperatures, they are not normally compatible with VLSI processes.

A further advantage of this spatial light modulator is that after the two substrates are bonded together, the moving parts are fully encapsulated. This provides an excellent method of packaging and will lead to high device robustness.

The spatial light modulator of this invention has the further advantage that it is inexpensive and straightforward to construct. It is comprised of two substrates: one which is made using standard VLSI techniques, and a second which is very simple to fabricate.

Yet another advantage of this spatial light modulator is that a light blocking aperture layer, as well as other planar optics, can be incorporated into the optically transmissive substrate. This can improve the contrast ratio and increase the effective light deflection angle, and reduce the cost of free-space optics at the systems level.

These and other objects and advantages will become apparent to those skilled in the art after consideration of the ensuing drawings and detailed description.

| REFERENCE NUMERALS IN THE DRAWINGS |
|---|
| 20 Optically transmissive substrate |
| 22 Aperture layer |
| 24 Protective layer |
| 25 Via |
| 26 Sacrificial layer |
| 28 Mirror layer |
| 30 Photoresist hold |
| 32 Reflective layer |
| 34 Circuit substrate |
| 36 Address circuit line |
| 38 Passivation layer |
| 40 Via |
| 42 Bottom electrode |
| 44 Pillar |
| 46 Passivation layer |
| 48 Mirror |
| 50 Hinge |
| 54 Attachment region |
| 56 Incoming light beam |
| 58 Outgoing light beam |
| 60 Word line |
| 62 Bitline |

DESCRIPTION OF THE PREFERRED EMBODIMENTS

Figure 1:
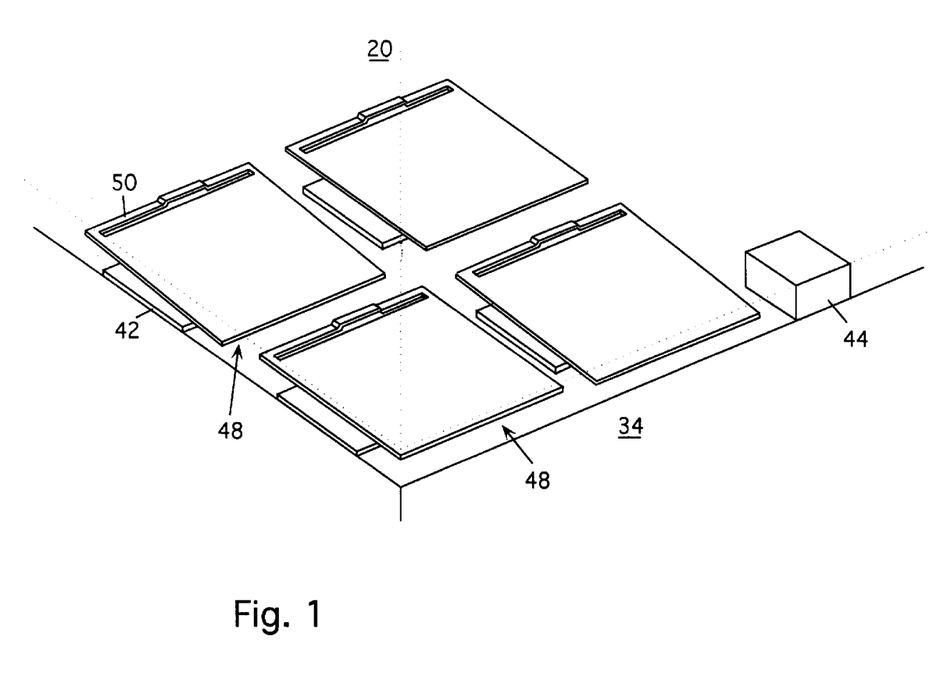
FIG. 1 shows a perspective view of a corner of the SLM device.

A perspective view of a preferred embodiment of the spatial light modulator of this invention is shown in FIG. 1.

Several rigid mirrors 48 are attached to an optically transmissive substrate 20. The mirror 48 closest to the viewer is in the off or undeflected position, while the mirrors in the two adjacent positions are in their on or deflected states. The aperture layer between the mirrors and the optically transmissive substrate is not shown for clarity.

Figure 2A:
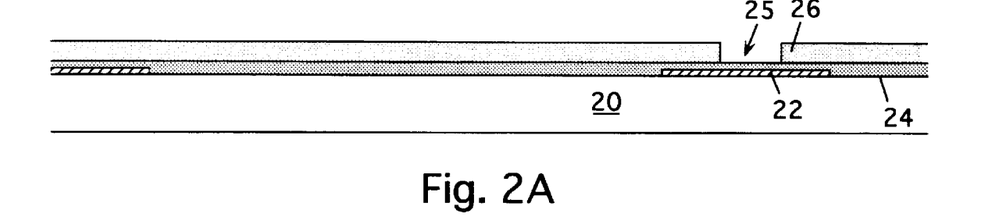
FIGS. 2A–G show a basic fabrication process flow in cross-section.
Figure 2B:
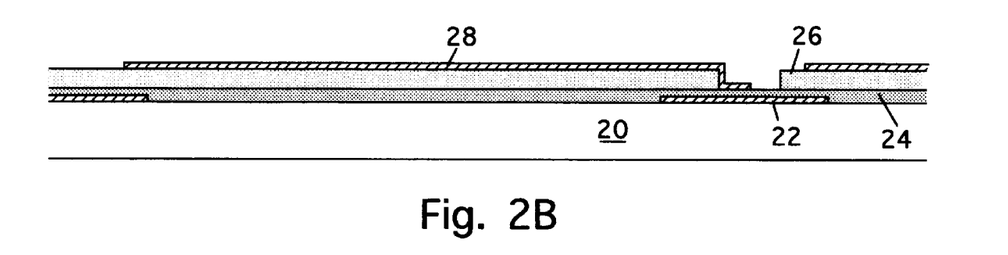
Figure 2C:
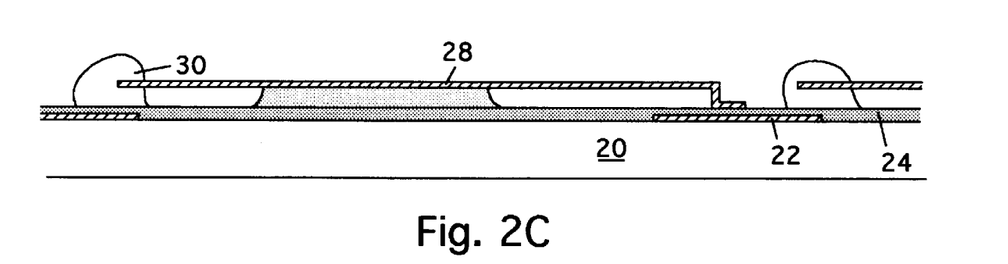
Figure 2D:
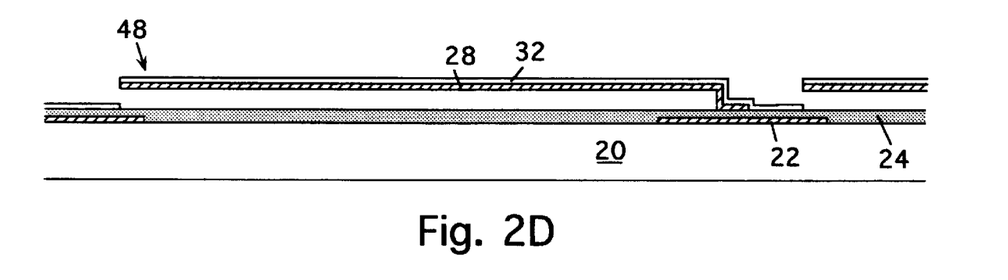

The fabrication process to produce the micro-mechanical spatial light modulator (SLM) of this invention is illustrated in cross-section in FIGS. 2A–G. In the most preferred embodiment of the reflective deflecting elements are rigid mirrors and are attached to the optically transmissive substrate 20. The substrate 20 is made of which can withstand subsequent processing temperatures. As seen in FIG. 2A, in the first fabrication step, a 50 nm thick layer of tungsten is deposited and patterned to form a light-blocking aperture layer 22. Tungsten is a refractory metal and remains stable during subsequent steps. Next a 200 nm protective layer 24 of LPCVD-grown silicon nitride is deposited, as both an electrical insulator and an etch protection later. This is followed by a 0.5 $\mu$m thick silicon dioxide sacrificial layer 26, which will eventually be removed. After holes 25 going down to protective layer 24 are patterned as seen in FIG. 2A, a second low-stress silicon nitride mirror layer 28 of 150 nm thickness is deposited. The deflectable mirrors are created by patterning layer 28 as seen in FIG. 2B (a top view of this pattern can be seen in FIG. 8A). Next, the sacrificial layer 26 is partially removed in hydrofluoric acid (HF). Before complete release, a photoresist layer is patterned to form small holds 30 as shown in FIG. 2C. The holds keep the mirrors immobile while all of the sacrificial layer 26 is removed via a second HF etch. The holds prevent the mirror layer 28 from being pulled to the substrate 20 by capillary forces and also prevent the mirrors from being damaged during wet rinsing and drying. After the sacrificial layer 26 has been completely removed, the holds 30 are removed using an oxygen plasma dry etch. As seen in FIG. 2D, what remains after this etch are fully released mirrors 48. As a last step, a thin 30 nm reflective layer 32 of aluminum is deposited on the entire mirror array. The aluminum also insures that all of the mirrors are electrically connected.

Figure 2E:
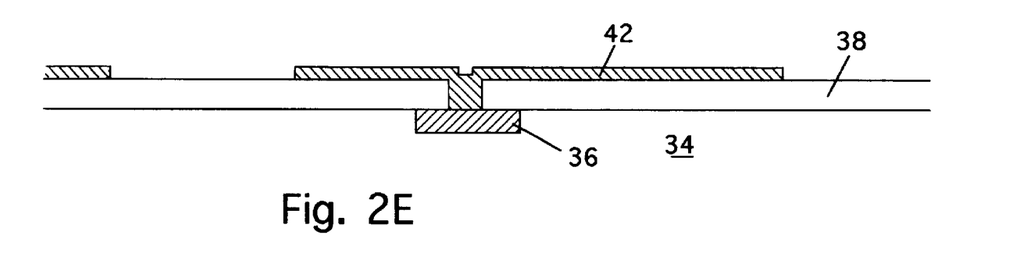
Figure 2F:
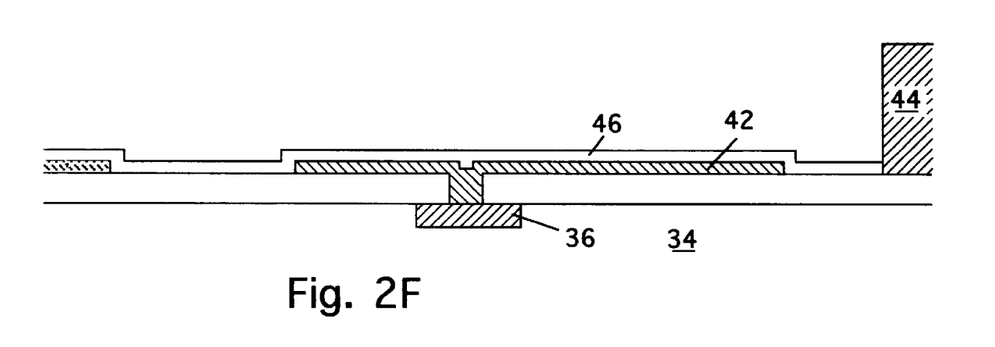
Figure 6:
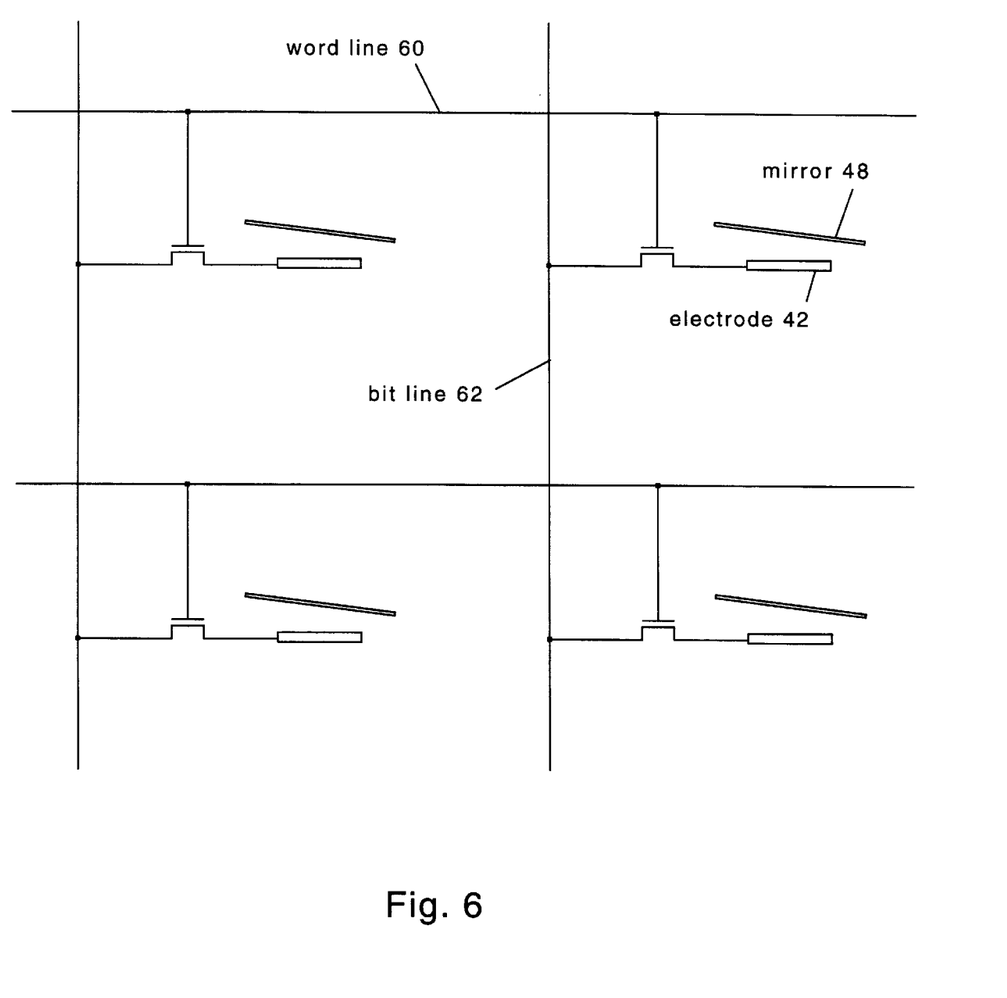
FIG. 6 shows a method by which the SLM pixels may be individually addressed using MOS transistors.

The bottom circuit substrate 34 seen in FIG. 2E is fabricated using standard VLSI techniques. An electrical schematic of one embodiment of the addressing circuitry is shown in FIG. 6. It resembles a standard memory array. Typically at the end of the VLSI processing a passivation later 38 is deposited over the circuitry. We etch vias 40 down to the addressing electrodes 36 underneath the passivation layer. Following this, a 0.5 $\mu$m aluminum layer is deposited and patterned to form bottom electrodes 42. Many configurations are possible: what is important is that the active bottom electrode should be physically located higher than the rest of the circuit components and interconnects. This way the electrostatic interaction of the bottom electrode with the overhanging mirror will be the principle interaction with the mirror and the principle means of its deflection. To prevent the electrodes 42 from shorting to the aluminum-coated mirrors, a second passivation layer 46 of 0.5 $\mu$m thick silicon nitride is deposited. To insure a fixed separation between the two substrates, a laminate of silicon dioxide (2.5 $\mu$m) topped by chromium (50 nm) and indium (200 nm) is deposited and patterned to form pillars 44 of fixed height. The finished circuit substrate is shown in FIG. 2F.

Figure 2G:
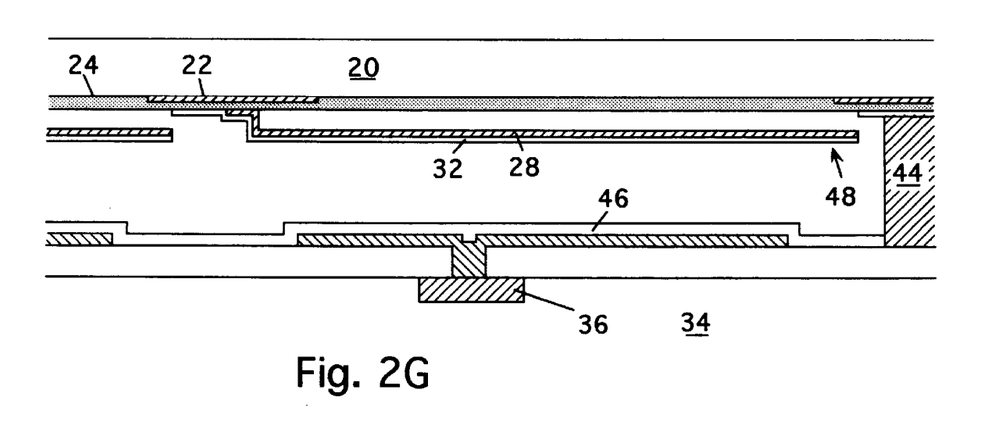

To bond optically transmissive substrate 20 to the circuit substrate 34, the substrates are aligned optically and held together while heat is applied to melt the indium and form a seal. The finished device is seen in FIG. 2G. After cooling, the edges of the substrates can be glued and bond wires attached to make a very robust unit.

Figure 3A:
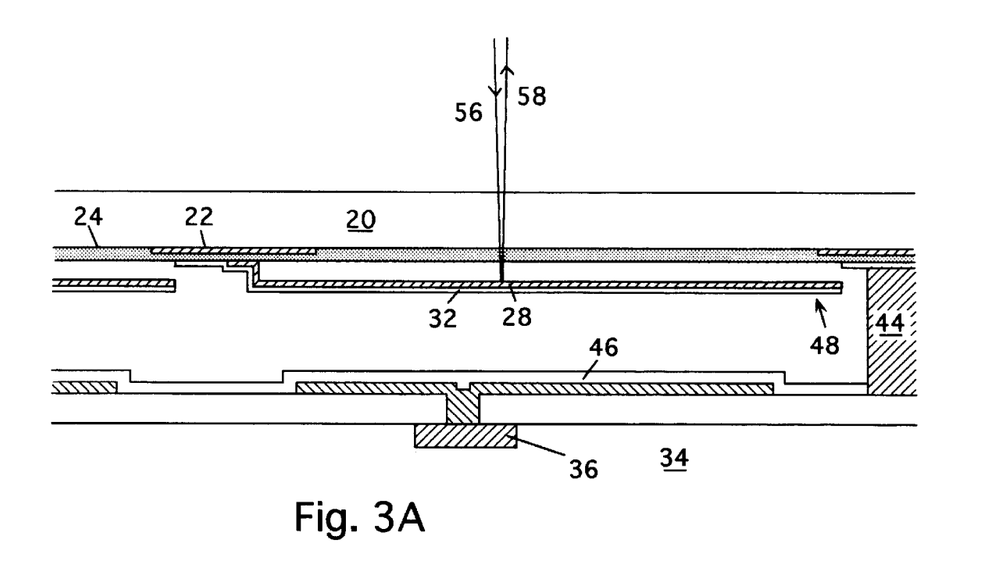
FIGS. 3A–B show in cross-section a single mirror modulating a light beam.
Figure 3B:
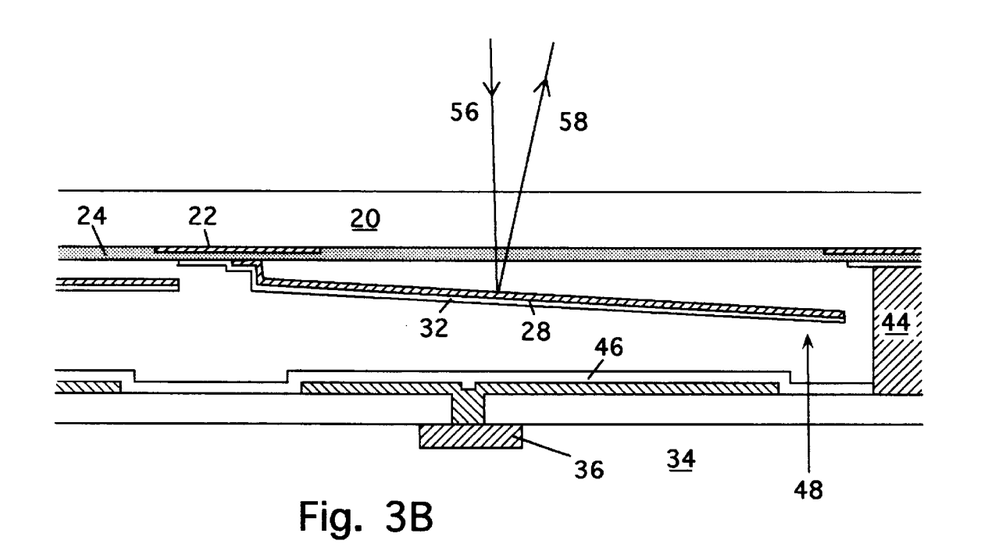

The operation of the above-described embodiment is shown in FIGS. 3A–B. In FIG. 3A the mirror 48 is undeflected. In this unbiased state, an incoming light beam perpendicularly incident to the modulator will pass through the optically transmissive substrate 20 and be reflected by the aperture layer 22 and the flat mirrors 48. The angle of the outgoing light beam 58 will then also be perpendicular to the optically transmissive substrate, within diffraction limits. Therefore, the modulator will behave optically as a perfect large pitch diffraction grating, which will diffract light only through a very small angle (about one degree for a 25 $\mu$m pitch grating), which is not sufficient to scatter any light into imaging optics. The incorporation of the aperture layer 22 into the optically transmissive substrate is a significant advantage of this modulator over the DMD and GLV: it simply and elegantly eliminates unwanted light scattering.

The modulator with a voltage bias applied between the mirror 48 and the bottom electrode 42 applied is shown in FIG. 3B. The mirror is deflected due to electrostatic attraction. Because of the design of the hinge, one end of the mirror will deflect towards the bottom silicon substrate. This will deflect the outgoing light beam 58 through a significant angle, and into the imaging optics.

Figure 4:
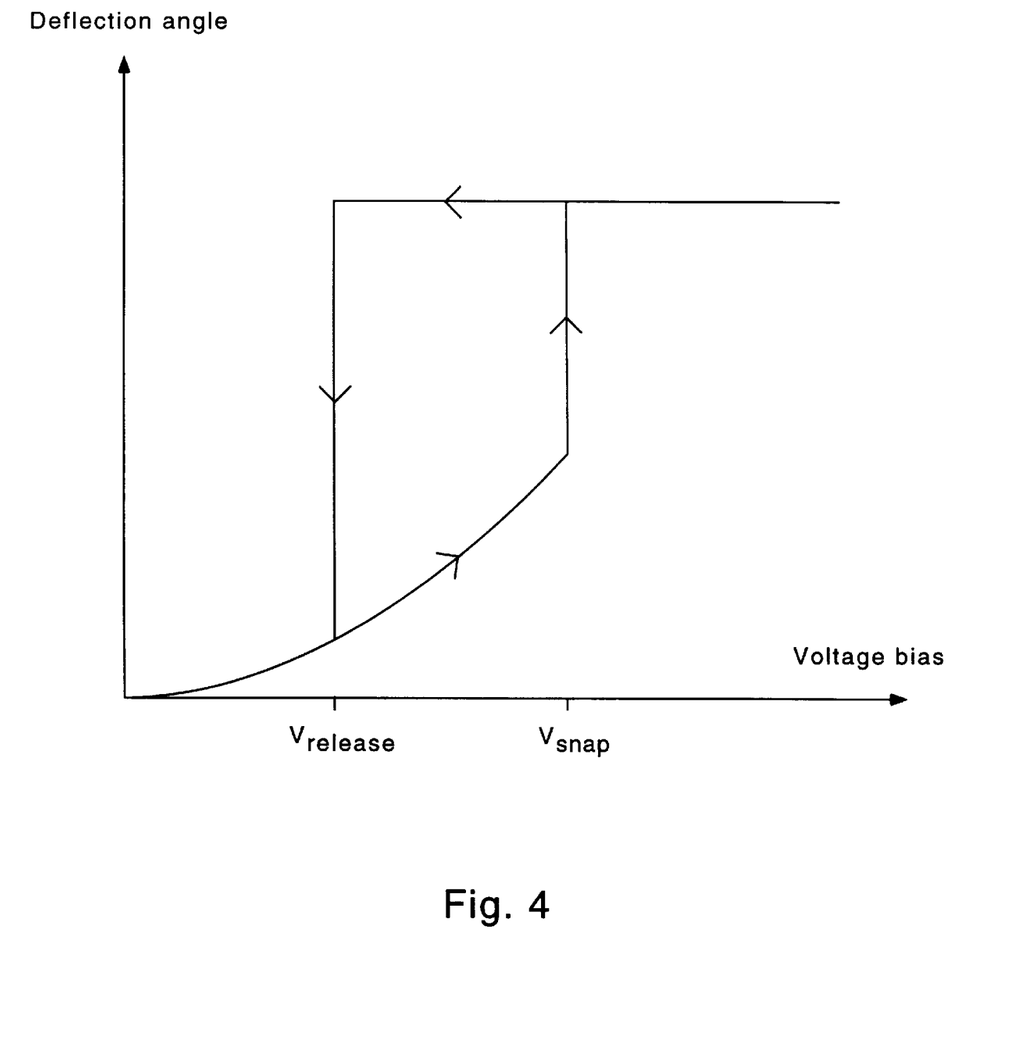
FIG. 4 shows the deflection angle of a mirror versus applied voltage bias.
Figure 5:
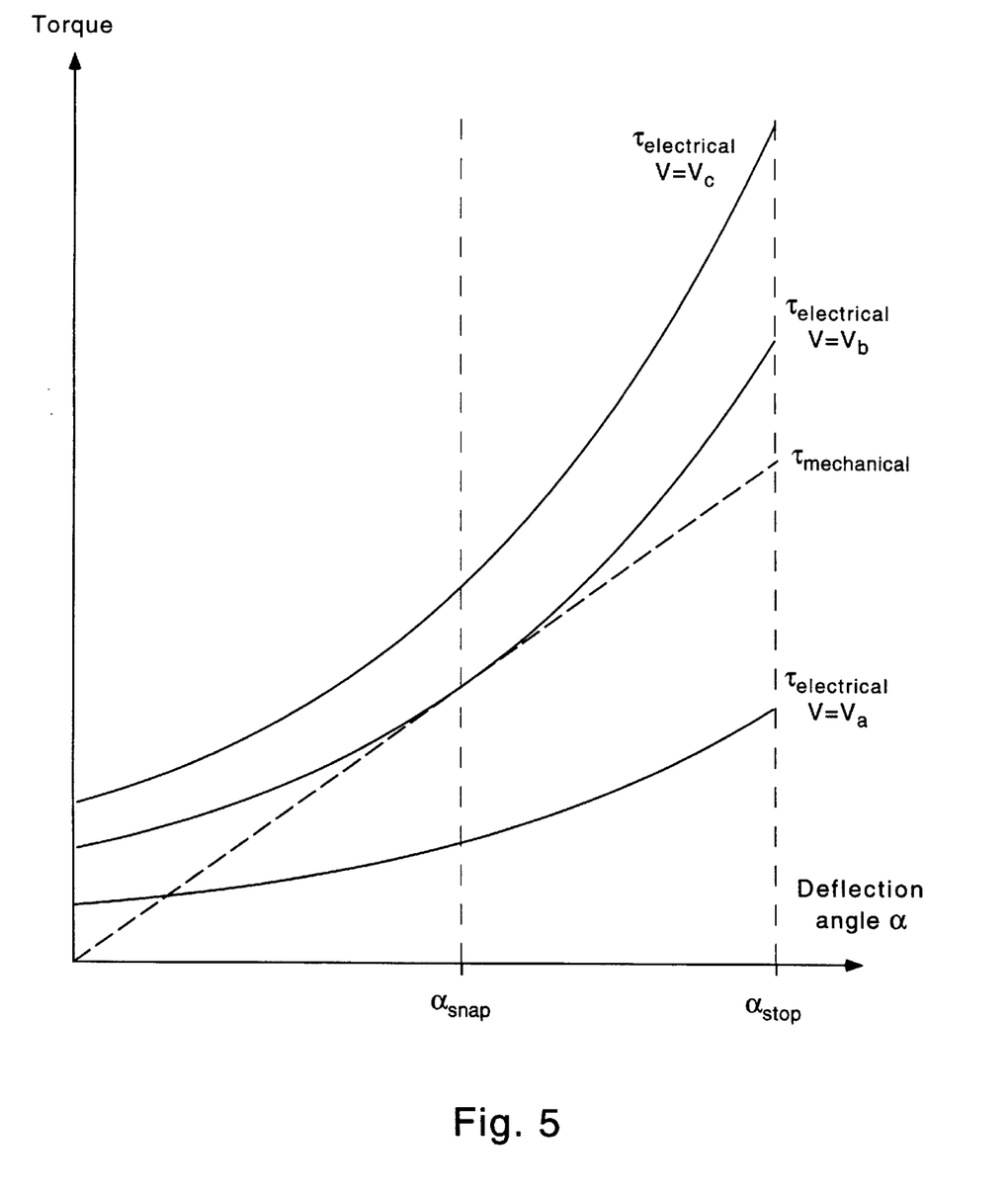
FIG. 5 shows the electrical and mechanical torques acting on a deflectable mirror for several different voltage biases.

The fall electromechanical characteristics of the modulator are further elucidated in FIGS. 4–5. In FIG. 4, we plot deflection angle a as the voltage bias is increased. We observe hysteresis: a bistability exists since the mechanical force required for deflection is roughly linear, whereas the electrostatic force obeys an inverse square law. As a voltage bias is applied, the mirror deflects. When the mirror deflected past the snapping voltage $V_{snap}$, the restoring mechanical force can no longer balance the electrostatic force and the mirror snaps to the substrate. The voltage must be lowered substantially below the snapping voltage (to $V_{release}$) in order for the mirrors to return to their undeflected position. This latching action allows driver circuitry to be placed off-chip or only at the periphery.

In FIG. 5, we plot mechanical and electrical torques vs. deflection angle $\alpha$ as the applied voltage bias is increased and the mirror tilts. The mechanical torque ($\tau_{mechanical}$) is linear in angle of deflection (horizontal axis). Each electrical torque ($\tau_{electrical}$) curve obeys an inverse square law and rises sharply with increasing angle, as the capacitance of the mirror-electrode structure is increased. At low voltage biases, as exemplified by bottom curve ($V=V_a$), there is an equilibrium point: if the mirror tilts slightly down (larger deflection angle), the upward-directed mechanical force will dominate and the mirror will deflect back up to its equilibrium position. Likewise, if the mirror is slightly less tilted than the equilibrium position, the downward-directed electrical force will dominate and restore the equilibrium situation. By changing the on-state voltage bias, the tilt of the mirror is controlled. If the voltage bias exceeds a critical value (here $V=V_b$, as seen in the middle curve), the equilibrium no longer exists and the mirror snaps to the lower substrate. It many be desirable to avoid this mode of operation: it is well known that micro-mechanical elements can easily stick together. Snapping can be avoided by keeping $V<V_b$. The snapping angle does not depend significantly on the substrate-substrate separation and occurs when the mirror is approximately half-way deflected towards the lower substrate if the mechanical torque is linear in angle $\alpha$.

If the modulator is operated at voltages past the snapping point, it can be operated in a digital manner using either active addressing, with a transistor at each pixel location, or using passive addressing, by exploiting the electromechanical bistability. If the modulator is operated at voltages below the snapping point, it can operated in an analog fashion using active addressing. The mirror deflection will then be proportional to the charge stored at each coresponding electrode. Operation below the snapping point also has the advantage of preventing mechanical contact during operation, eliminating possible sticking problems. The use of high quality mechanical materials results in good uniformity over the pixel array, and makes analog operation practical.

To address each pixel of the SLM individually, an addressing scheme embodied in the circuitry of FIG. 6 can be used. We have not shown the substrates, and the mirror 48 and bottom electrode 42 are drawn symbolically. The scheme is identical to that used for a DRAM (dynamic random access memory). Each pixel is driven by an NMOS transistor. The state of one row of pixels is set by holding the bit lines 62 at the appropriate bias voltage for the desired mirror deflection. The bias is relative to the mirrors 48, which are connected to ground. The word line 60 is then pulsed low-high-low and the voltage value is stored as charge between the bottom electrode 42 and mirror 48. An additional capacitor may have to be placed electrically in parallel to the mirror-electrode combination to insure that enough charge is stored to overcome leakage.

With the appropriate choice of dimensions (substrate separation of 1 to 5 $\mu$m and hinge thickness of 0.1 to 0.3 $\mu$m), a modulator can be made to have an operating voltage of only a few volts. The voltage at which the addressing circuitry must operate can be made even lower by maintaining the mirror potential negative, as referenced to the circuit ground. This results in a larger difference in deflection angle for a given voltage difference.

Figure 7A:
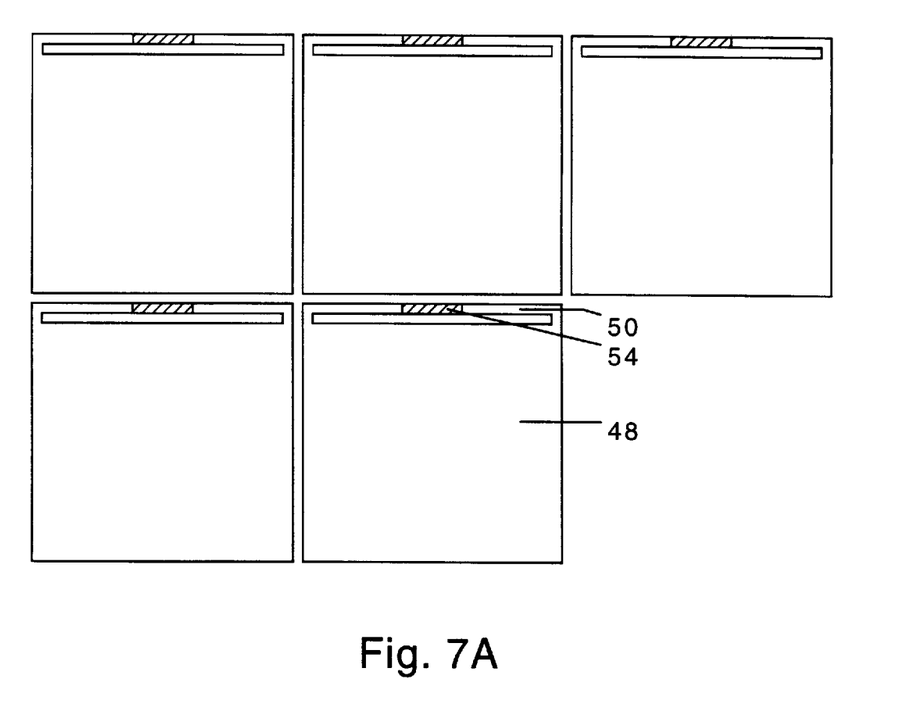
FIGS. 7A–C show top view of mirror arrays with different hinge designs.
Figure 8:
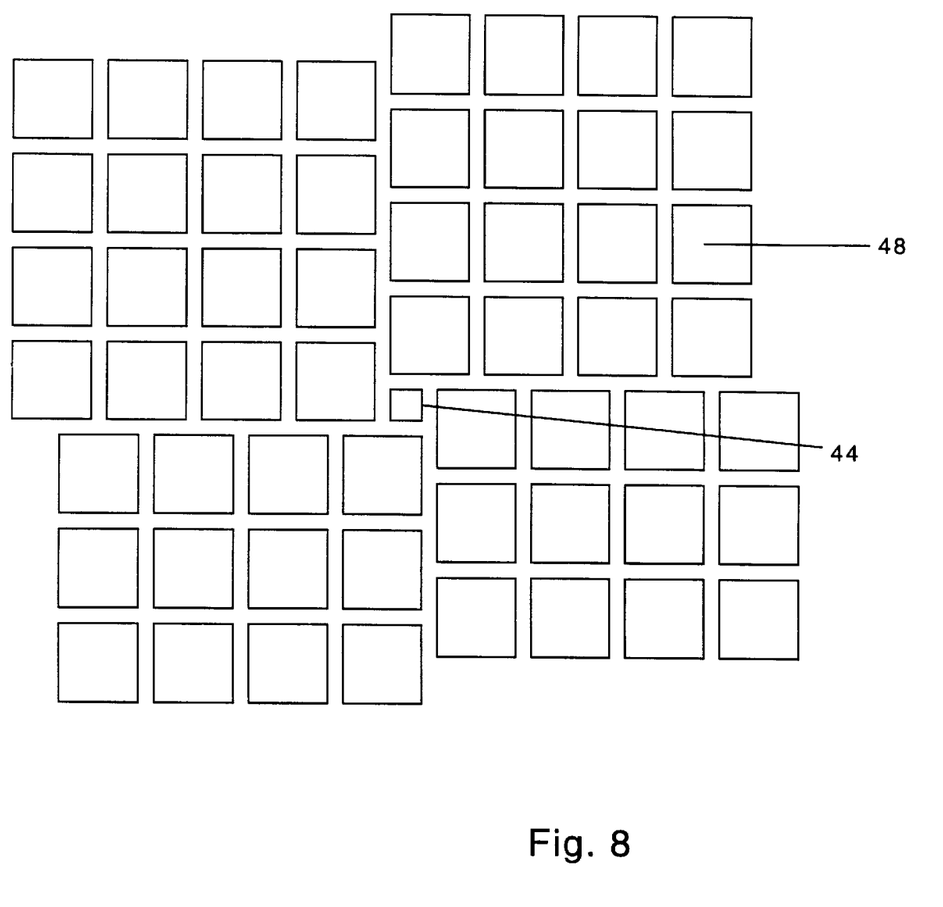
FIG. 8 shows spacer placement in a dense pixel array.

A top view of a section of the mirror array is presented in FIG. 7A. Depending on the thickness of the two substrates, pillars 44 may need to be embedded in the mirror array itself. A layout which accomplished this and maintains a reasonably contiguous SLM array is shown in FIG. 8.

Figure 7B:
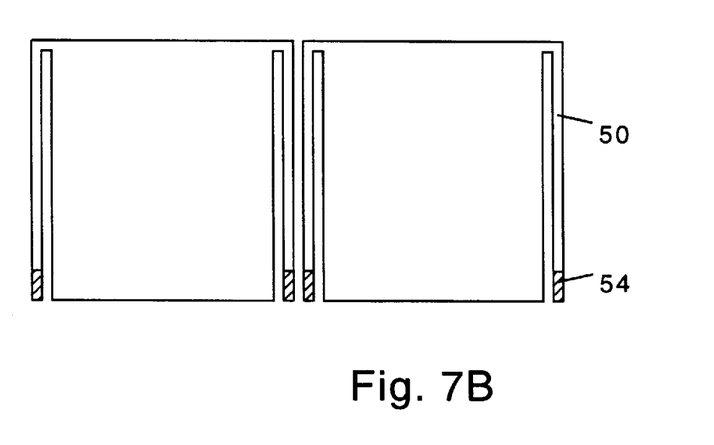
Figure 7C:
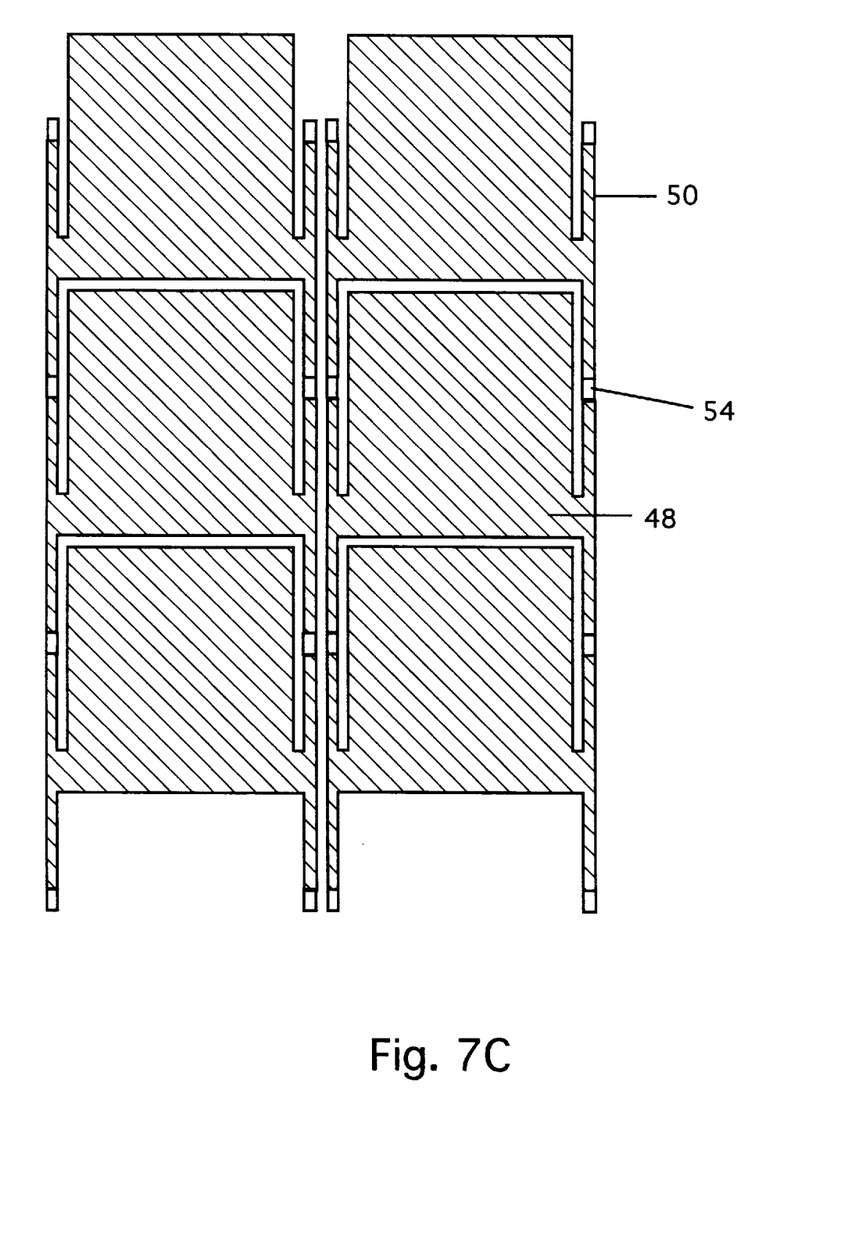

It is of course obvious that the number of variations in the design of the deflectable reflecting elements that constitute the optically active component of the spatial light modulator is truly huge. One simple variation is shown in FIG. 7B. Here the hinges operate by flexion and not by torsion. This embodiment uses a single layer to form both the hinge and the mirror; a simple variation would be to deposit different layers for the hinge and the mirror plate itself. For example, a thin torsion-type hinge could cross the plate, attaching to the plate only at one point. Alternatively, one could thin an area of the mirror layer via an etch to form a thinner hinge, and thus lower switching voltages while keeping the plate rigid. In FIG. 7C, we show a hinge design where the mechanical restoring force will increase with faster-than-linear dependence on deflection, as the strain changes from torsion to tensile. A hinge with this characteristic might be useful when the mirror is operated in an analog manner, since the switching angle will be increased.

A single square mirror is not the only possible reflective deflectable element possible; other designs, such as a cloverleaf or grating-like design are possible. For example, a row of skinny "mirrors" all deflecting in unison can form a switchable diffraction grating. It is even feasible that the reflective deflectable element is a metal-coated membrane. The deflectable element design could also be made so that one part of the element moves away from the lower substrate instead of towards it.

If the modulator is operated so that the deflectable element touches the lower substrate when actuated, additional structure may be added. For example, in a mirror device, protruding bumps can be fabricated to reduce the total surface area actually in contact. Additionally, a conducting transparent layer, such as indium tin oxide, can be deposited before the protective layer 24. A bias applied between the conducting transparent layer and the mirrors will actively pull the mirrors to the top substrate 20 and reset them to their off state.

There are many different methods to make electrical circuitry that performs the addressing function. A DRAM scheme was outlined above, but static RAM cells could also be used. Also as described above, a passive addressing scheme can be implemented that exploits the bistability inherent in this type of electromechanical device. Instead of all of the deflectable elements being electrically connected, addressing would be split between the bottom substrate where electrodes would run in one direction and the top substrate where the deflectable elements would be connected together in rows in a direction perpendicular to the columns. If voltage biases are applied to a row and a column, they would add only at one pixel, allowing it to be addressed individually. A large bias would turn on a pixel, a small bias would reset it, and an intermediate bias would leave the state of the deflectable elements unchanged. Even if an active addressing scheme is used, electrically connecting the deflecting elements of the top substrate in rows could increase addressing efficiency.

In the preferred embodiment, the optically transmissive substrate contains an aperture layer in the shape of a grid. This layer may be further modified to comprise any binary optical pattern. Thus, the modulator could have more of a diffractive, as opposed to reflective, nature. In addition, other planar optical components can be integrated into the optically transmissive substrate, at either the top or bottom surface. Some of the many possible structures include color filters composed of one or a stack of layers, micro-lenses, and color-dispersive or diffractive features. See for example Jahns and Huang, "Planar Integration of Free-Space Optical components" Applied Optics, vol. 28, No. 9, 1 May 1989. The ability to integrate this optical functionality into the optically transmissive substrate increases achievable contrast ratio and lowers costs by reducing the cost of free-space optics at the systems level.

There are many fabrication process modifications which can be made. Instead of an indium seal, the substrates may be joined using a method very similar to that used in flat panel LCD manufacturing, which also requires sub-micron and micron vertical and lateral tolerances respectively. As before, the substrates will be optically aligned (to within 1–2 microns). The gap between the two substrates would be partially evacuated, and the resulting pressure difference would push them together. They can then be bonded with adhesive along the edges. The pillars on one substrate will precisely control the separation distance. In any scheme, of course, the pillars can be built on either substrate. It is important to note that the method of deflection is also not necessarily restricted to electrostatic: thermal and piezoelectric actuation are among alternate possibilities. There can also be a top to bottom substrate electrical connection at each pixel.

Many material substitutions are possible for the micromechanical elements: one possibility is the use of another type of ceramic (e.g. silicon dioxide) for the mirror, or even making the mirror completely out of a metal (e.g. an aluminum alloy). There are also many possibilities for the sacrificial layer material, such as silicon. Silicon could also be used instead of tungsten as the grid material. This would make the process more compatible with silicon nitride deposition facilities that are used for CMOS chip production. The pillars can also be made from a wide variety of materials.

CONCLUSION AND RAMIFICATIONS

In summary, the spatial light modulator of this invention is a device that exhibits many desirable properties, including high resolution, high optical efficiency, high contrast ratio or modulation depth, and high mechanical reliability. The modulator has application in a wide variety of areas, including projection display systems. Low switching voltages and the innovative design of the modulator enable standard VLSI circuitry to be used as the addressing mechanism. This makes the modulator easy and inexpensive to manufacture.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A spatial light modulator comprising:
   an optically transmissive substrate having an upper surface and a lower surface;
   at least one deflectable reflective element attached to the lower surface of said optically transmissive substrate;
   a second substrate positioned below, parallel, and spaced apart from the lower surface of said optically transmissive substrate, said second substrate containing electronic circuitry capable of selective actuation of each deflectable reflective element attached to said optically transmissive substrate.

2. The spatial light modulator of claim 1, wherein said optically transmissive substrate contains an aperture layer, whereby light may pass only through a subset of the substrate area.

3. The spatial light modulator of claim 1, wherein said optically transmissive substrate contains additional planar optical elements.

4. The spatial light modulator of claim 1, wherein each deflectable reflective element is electrically conductive and is deflectable by electrostatic force.

5. The spatial light modulator of claim 1, further comprising means for electrically connecting each said deflectable reflective element to said second substrate.

6. The spatial light modulator of claim 1, wherein each said deflectable reflective element is substantially rigid and is attached to said optically transmissive substrate by flexible hinges.

7. The spatial light modulator of claim 4, further comprising means for limiting the area of contact between each said deflectable reflective element and said second substrate.

8. The spatial light modulator of claim 4, further comprising landing electrodes placed on top of said second substrate, and held at a potential equal to that of each said deflectable reflective element.

9. The spatial light modulator of claim 1 comprising multiple deflectable reflective elements, wherein said deflectable reflective elements are grouped in multiple subsets, each subset oriented so as to selectively direct incident light into a specific angle.

10. The spatial light modulator of claim 1, wherein each said deflectable reflective element is composed of a laminate including a metallic layer.

11. The spatial light modulator of claim 1, wherein said optically transmissive substrate includes a conducting layer for creating electrostatic attraction between each said deflectable reflective element and the optically transmissive substrate.

12. The spatial light modulator of claim 1, further comprising electrodes connected to said circuitry, whereby said electrodes actuate each said deflectable reflective element by electrostatic attraction.

13. The spatial light modulator of claim 1, wherein each said deflectable reflective element comprises a metallic layer and optionally comprises a structural support layer.

14. The spatial light modulator of claim 1, wherein each said deflectable reflective element further comprises:
   a substantially rigid rectangular plate which is attached to said transmissive substrate with one or more torsion hinges located along one edge of said plate, whereby said plate may rotate about said edge.

15. A reflective spatial light modulator comprising:
   a substrate having an array of electrodes thereon;
   an optically transmissive plate having an upper side and an under side, the optically transmissive substrate being positioned above, parallel to, and spaced apart from the substrate, and having an array of conducting deflectable reflective elements corresponding to the array of electrodes and attached to the underside of the optically transmissive plate.

16. The reflective spatial light modulator structure of claim 15, wherein said optically transmissive plate contains an aperture layer, whereby said aperture layer allows light to pass only through a subset of the substrate area.

17. The spatial light modulator of claim 15, wherein:
   said deflectable reflective elements are electrically connected in rows;
   said electrodes are electrically connected in columns that cross said rows to define pixel locations;
   whereby individual pixels may be turned on and off by selectively applying appropriate row and column biases and creating electrostatic attraction.

18. A process for the fabrication of a spatial light modulator, comprising the steps of:
   depositing a spacer layer on an optically transmissive substrate;
   etching a pattern of holes in said spacer layer whereby said holes allow attachment of subsequent layers to the substrate;
   depositing a reflecting layer on said spacer layer;
   patterning the reflecting layer to define one or more deflectable reflective elements;
   etching the spacer layer so that the deflectable reflective elements are free and may deflect;
   forming addressing circuitry and electrodes on a second substrate;
   aligning and joining the optically transmissive substrate and the second substrate, whereby the deflectable reflective elements may be selectively actuated by said addressing circuitry and electrodes.

19. The process for the fabrication of a spatial light modulator of claim 18, wherein an aperture layer is deposited on said optically transmissive substrate before said spacer layer, whereby said aperture layer allows light to pass only through a subset of the substrate area.

* * * * *